United States Patent [19]

Illbruck et al.

[11] Patent Number: 5,345,720
[45] Date of Patent: Sep. 13, 1994

[54] INSULATION PART

[75] Inventors: Michael Illbruck, Leverkusen; Frank Gottschild, Wolfsburg, both of Fed. Rep. of Germany

[73] Assignee: Illbruck GmbH, Leverkusen, Fed. Rep. of Germany

[21] Appl. No.: 4,705

[22] Filed: Jan. 14, 1993

[30] Foreign Application Priority Data

Jan. 17, 1992 [DE] Fed. Rep. of Germany ... 9200501[U]
Mar. 20, 1992 [DE] Fed. Rep. of Germany ....... 4209024

[51] Int. Cl.⁵ .............................................. B60J 5/04
[52] U.S. Cl. .................................... 49/502; 296/39.3; 296/146.7
[58] Field of Search ................. 49/502; 296/146.7, 393

[56] References Cited

U.S. PATENT DOCUMENTS

| | | | |
|---|---|---|---|
| 2,124,463 | 7/1935 | Cunnington | 49/502 X |
| 3,989,275 | 11/1976 | Finch et al. | 296/146.7 X |
| 4,741,945 | 5/1958 | Brant et al. | 296/39.3 X |
| 4,923,542 | 5/1990 | Jamcki et al. | 49/502 X |
| 5,102,163 | 4/1992 | Ishikawa | 296/146.7 X |

FOREIGN PATENT DOCUMENTS

| | | |
|---|---|---|
| 7804040 | 5/1979 | Fed. Rep. of Germany . |
| 3510018 | 1/1986 | Fed. Rep. of Germany . |
| 8909961 | 2/1991 | Fed. Rep. of Germany . |

*Primary Examiner*—Philip C. Kannan
*Attorney, Agent, or Firm*—Martin A. Farber

[57] ABSTRACT

An insulation part (1) for acoustic insulation or sound absorption and preferably to serve as moisture barrier, which can be arranged in a hollow space (6) created by an outer wall (4) and an inner wall (3) of an automobile door (2), said insulation part being profiled and having a basis of foam and a continuously, approximately constant thin cross section as compared with the space between the inner surfaces of the outer wall (4) and the inner wall (3). In this connection, in order to obtain a simple but effective development, a bead (7) of substantially U-shape in cross section, developed, in particular, on the edge side and leads to a supporting of the single-layer insulation part on the inner surfaces of both the inner and the outer wall, is provided, a freely swingable section (13) of the insulation part (1) extending between two such bead formations (7, 8, etc.) which rest against both inner surfaces.

12 Claims, 8 Drawing Sheets

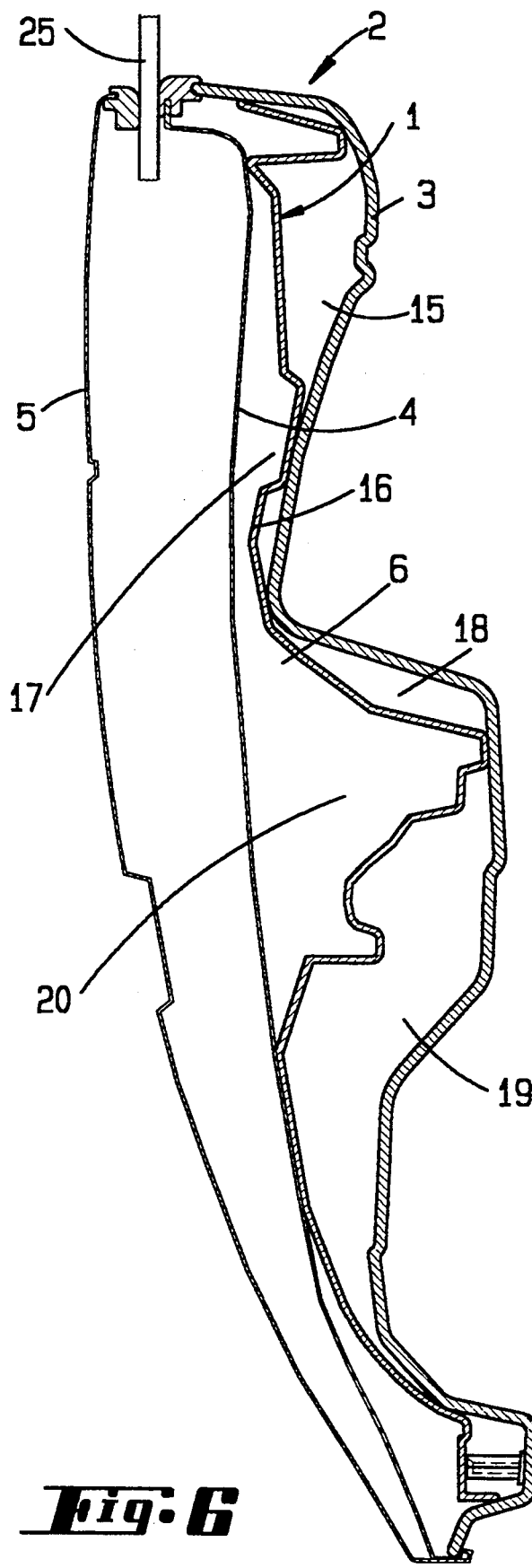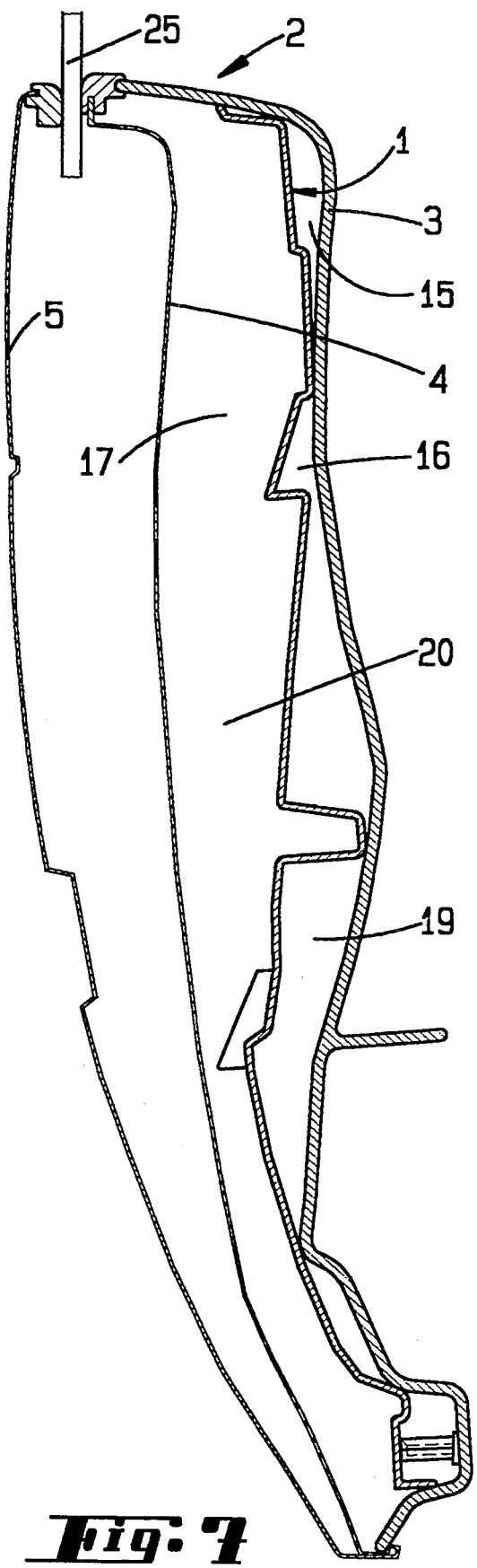

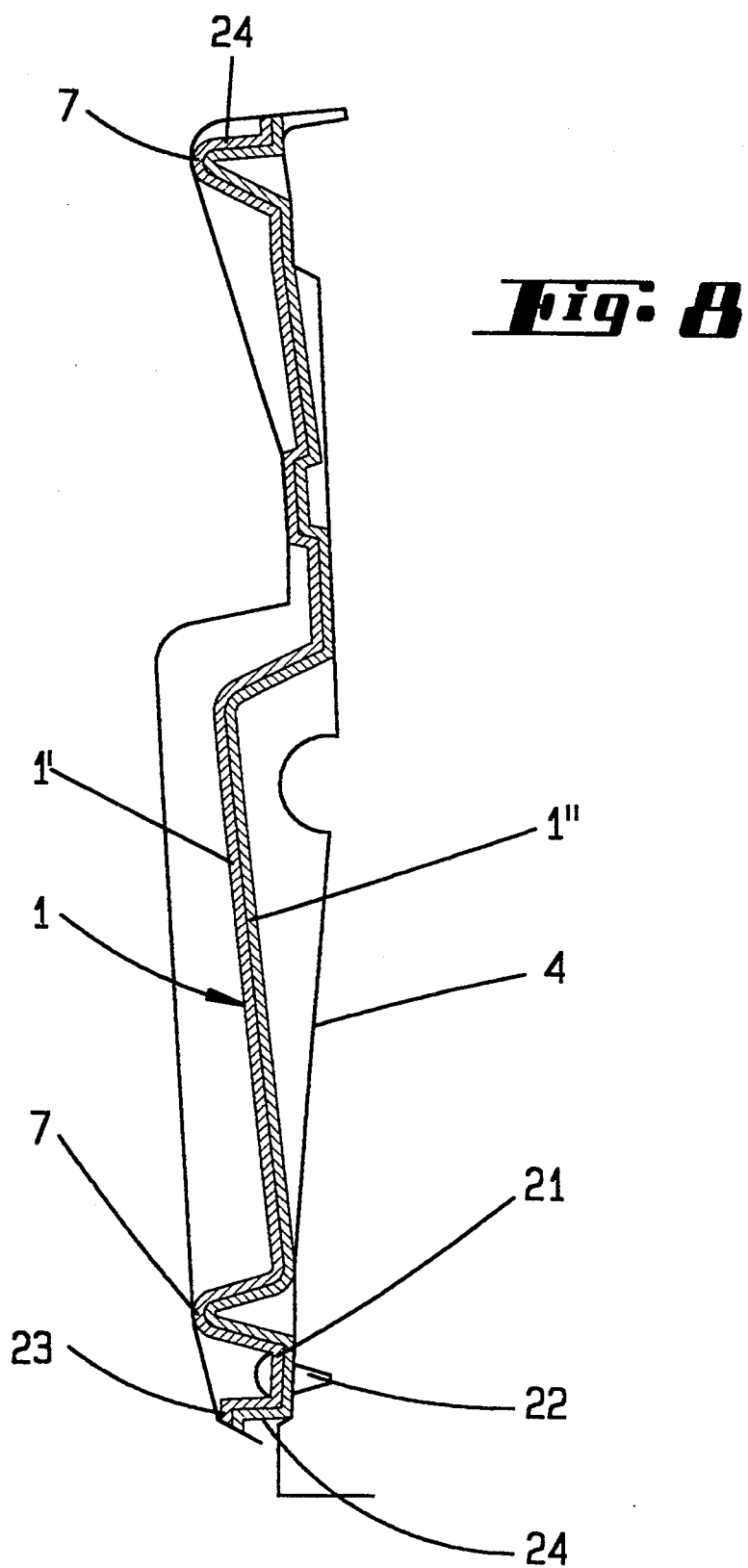

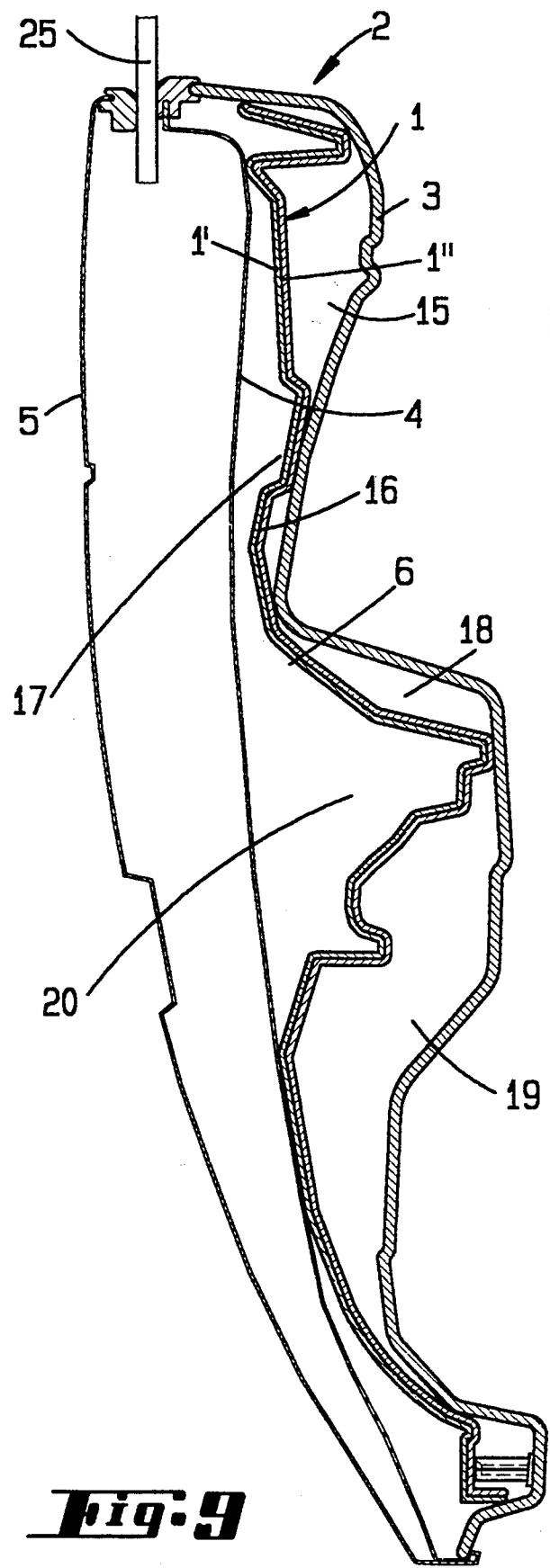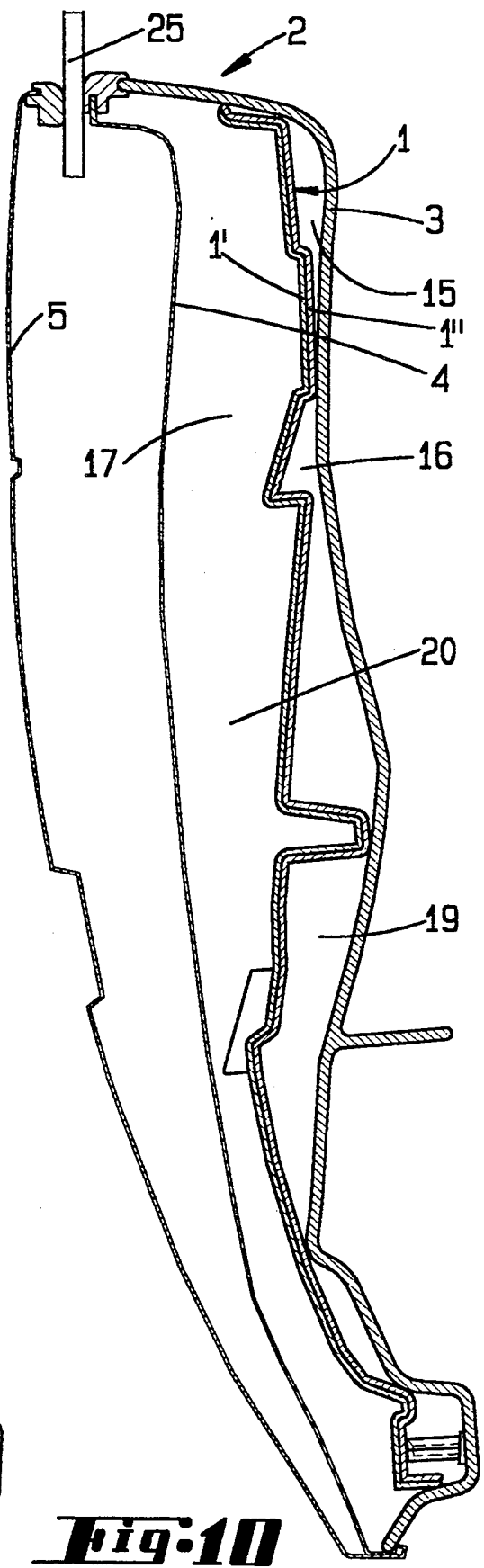

INSULATION PART

FIELD AND BACKGROUND OF THE INVENTION

The present invention relates to a foam insulation part for acoustic insulation or sound absorption and preferably as moisture barrier, which can be arranged within a hollow space created by an outer wall and an inner wall of the door of a motor vehicle. The insulation part is profiled and has a wall with a thickness which is approximately the same at all places and is thin as compared with the space between the inner surfaces of the outer and inner walls.

Since a long time ago one has provided moisture barrier in the form of a film in the hollow space of vehicle doors, for instance between the inner and outer plates. In this connection, reference is had, by way of example, to Federal Republic of Germany Utility Model 78 04 040.

Vehicle doors generally consist of an inner metal sheet and an outer sheet which are spaced from each other if only in order to receive the door-opening mechanism and the window crank, as well as the windowpane in the open condition of the window. Furthermore, adjoining it on the inside, there is another wall which is shaped to receive or directly to form an arm rest, a storage space, an ash tray, or the like. In addition to sealing the inside of the vehicle from penetration of moisture from the outside, there is also an increasing desire to obtain effective acoustic insulation and/or sound absorption.

In this connection, Federal Republic of Germany OS 35 10 018 is also known. Here, the insulation part, which also has sound absorption and insulating properties, consists of a foam blank with a foil applied facing the outside of the door, the foil being intended to provide the moisture barrier. The foam blank is so shaped that it lies substantially with its full surface against a metal wall of the door, insofar as holes are not present there. Furthermore, the foam part is relatively thick as compared with the width or thickness of the hollow space in which it is arranged.

Reference is further had to Utility Model 89 09 961. That utility model concerns an insulating part developed with a double wall. There are two layers of the insulating part which rest against each other. Due to the double-layer spaced structure it is as a whole relatively rigid.

SUMMARY OF THE INVENTION

It is an object of the invention to provide another insulation part which is improved to the greatest extent possible.

For this purpose, in the case of the object of the invention, the single-layer insulation part forms, seen in cross section, a substantially U-shaped bead, possibly several beads, but in particular on the edge side, which bead leads to a supporting of the one layer of the insulation part, over a relatively short distance, on both inner surfaces of the outer and inner walls. Between two such bead formations, which rest against the two inner surfaces, there is then developed a free standing (freely swingable) portion of the insulation part free in the sense that it is free to deflect without contacting the inner wall lining nor the inner wall of the car door. It has surprisingly been found that in the structural part consisting of a vehicle door a very effective reduction of the noise level within the vehicle can be obtained by such a thin-wall, profiled foam part which rests mutually against the two inner surfaces, forming interspersed, freely swingable sections. Different swingable regions depending on the desired acoustic insulation adapted to the specific type of vehicle can be obtained in the insulation part which is easily thermally deformable upon manufacture.

It is further advantageous to produce the insulation part of closed-cell foam. In this way, the desired moisture barrier is at the same time obtained. Furthermore, satisfactory sound absorption and sound-absorption results are also obtained. It is not necessary to use open-cell foam for the sound absorption. Here, the freely swingable regions enter into action. By suitable shaping, the insulating and sound-absorbing properties can also be adjusted in the direction of higher or lower frequencies. Nevertheless, it is, however, also possible—and furthermore possibly preferred in accordance with another embodiment which will be described below—to provide an (additional) layer of open-pore foam. This is then preferably attached to the layer of closed-cell foam, for instance, backed onto it. Otherwise, however, in this embodiment these two attached layers behave practically the same as the individual layer described above. They are also comparatively thin (referred to the hollow space in which they are arranged) and rest via the substantially U-shaped bead, possibly several of them, in particular, however, on the edge side, against the two inner surfaces of the outer and inner walls and are secured in place (practically alone) in the hollow space via this support, which applies in corresponding manner also to the embodiment first described.

In the two-layer construction, specifically, in each case the closed-pore layer rests only against the one inner wall and the open-pore layer against the other inner wall. The development is such that as a result of the formation of the bead in combination with the inner walls, the insulation part, in installed condition, results in several substantially closed air chambers of different size. By inner walls there are meant here, in this explanation by way of example of the invention, the inner wall of the inner-door lining and the outer wall of the inner wall of the actual sheet-metal door structure.

As a further development, it is advantageous, with regard to an edge bead, to develop it substantially continuously all around. Advantages in installation are also at the same time obtained thereby. The circumferential annular bead not only leads to the supporting against the inner and outer walls but it can, at the same time, also be bonded there, since correspondingly large-area regions are created in the regions of the bend. In addition to this, it has proven advantageous to develop a sealing lip adjacent to the edge of the bead on the outside. This sealing lip consists of a projection which is bent off in the form of a lip which is small as compared with the edge bead. In the installed condition this projection lies substantially on its end against an inner surface of the door lining. Due to the fact that the overall dimensions of the insulation part, particularly in the region of the edge bead and furthermore particularly in the region of the lip in question, are somewhat greater than the space available, there results, in installed condition, a pretensioning of the insulation part which presses the end surface of the lip against the inner wall in question.

It is not essential for the invention that said developments, such as, in particular, the mutual application against associated inner surfaces in the region of a bead formation be continuous and without exception in installed condition. It is merely necessary that these conditions are substantially present in installed condition. The sealing lip prevents the emergence of the residual energy (air-borne sound) at the outermost edge of the door inner lining. This sealing lip can replace the rubber sealing lip at the door inner lining which is known in the traditional constructions. The said development of the insulation part permits not only adaptation to the acoustic requirements by air chambers of different size with correspondingly freely swingable sections of the insulation part but, in addition, also a high-step profiling of the insulation part within the individual closed or substantially closed chambers. In a further advantageous embodiment, it can also be provided that in some or all of the chambers created in this manner, an absorber is provided in the form, for instance, of an open-cell foam, for instance polyurethane foam.

As a further development, it is also provided that the insulation part is clipped to the door in the region of said substantially circumferential edge bead. For this, it is advantageous also to provide a bonding. In accordance with the invention, the bead of adhesive is in this case laid continuously over perforations which are provided in order to receive the clips in the insulation part. Upon the mounting of the clips, a part of the adhesive bead is thus carried along by the end surface of the clip, as a result of which a mounting secured by bonding can be obtained in the region of the clipping. It is particularly preferred in this connection to develop an adhesive/clipping zone developed—seen from the bead—as valley adjoining the outer circumferential sealing bead.

BRIEF DESCRIPTION OF THE DRAWINGS

With the above and other advantages in view, the present invention will become more clearly understood in connection with the detailed description of preferred embodiments, when considered with the accompanying drawings, of which:

FIG. 6 is another sectional view of a door and insulation part;

FIG. 7 is a view in accordance with FIG. 6, seen in section in a plane parallel thereto;

FIG. 8 is a showing in accordance with FIG. 5, in the case of a double-layer embodiment;

FIG. 9 is a showing in accordance with FIG. 6, in the case of a double-layer embodiment; and FIG. 10 is an embodiment in accordance with FIG. 7, in the case of a double-layer embodiment.

DETAILED DESCRIPTION OF THE PREFERRED EMBODIMENTS

Figure 1:
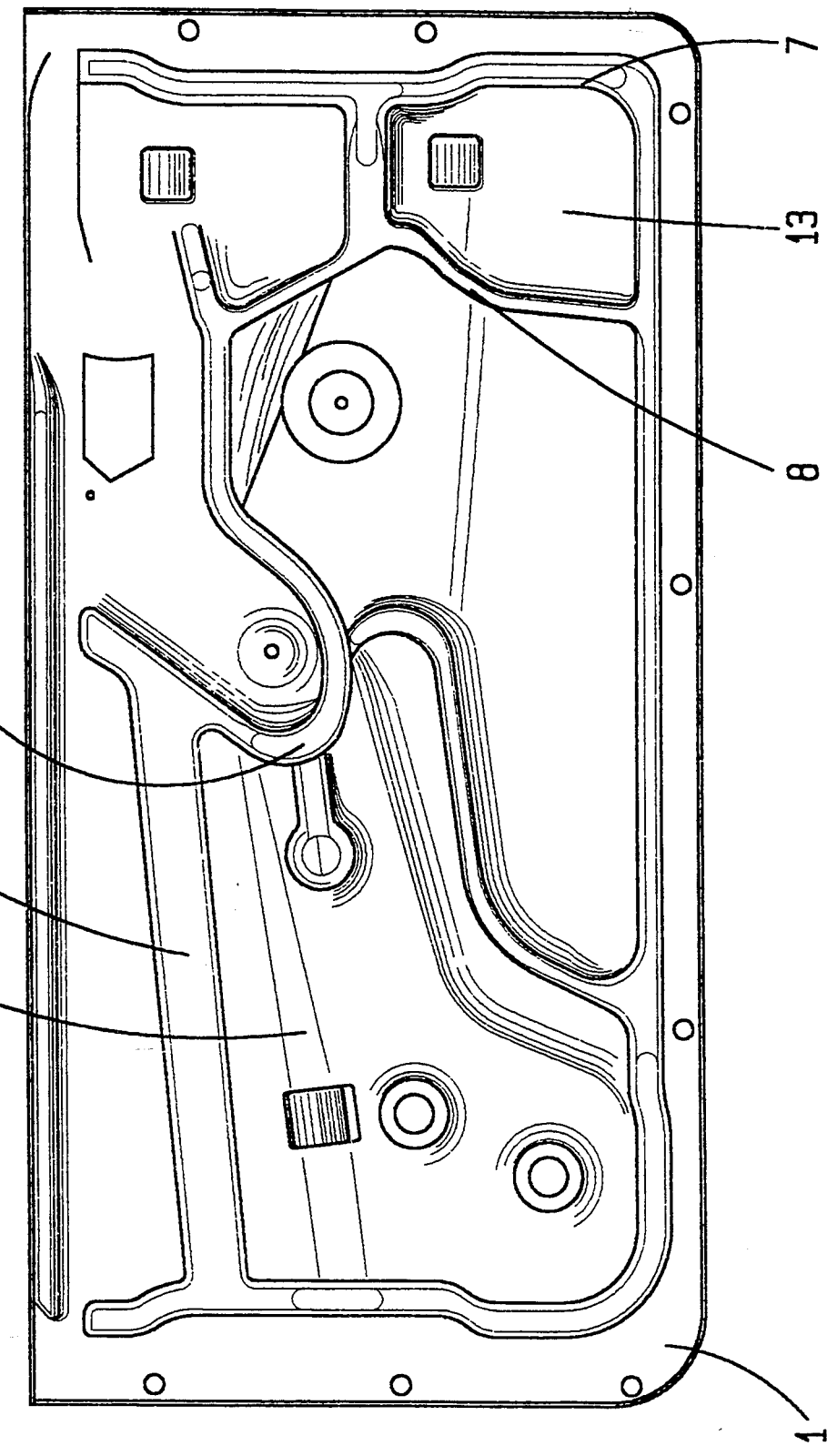
FIG. 1 is an elevation view of one side of the insulation part.

There is shown and described an insulation part 1 for installation in a vehicle door 2 (see, for instance, FIGS. 6 and 7).

In the embodiment shown (again with reference to FIGS. 6 and 7) the insulation part 1 is arranged between an inner wall lining 3 and an inner wall 4 of an automobile door. Opposite the inner wall 4, in outward direction, there can be noted an outer wall 5 of the automobile door. Between the walls 4 and 5 there is indicated a windowpane 25 which also, insofar as a movable window is concerned, can be contained within the hollow space created between the walls 4 and 5.

The insulation part 1 consists of a thin-wall foam part. The thinness of the wall is relative to the space 6 between the outer wall and the inner wall of the inner-wall lining 3 and the inner wall 4. For example, the thickness of the foam part of the insulation part 1 amounts to 1/10 to 1/20 of the corresponding perpendicular distance between said walls. However, as can also be noted from FIGS. 6 and 7, this distance varies greatly so that, as is evident, an average value is referred to here.

Figure 2:
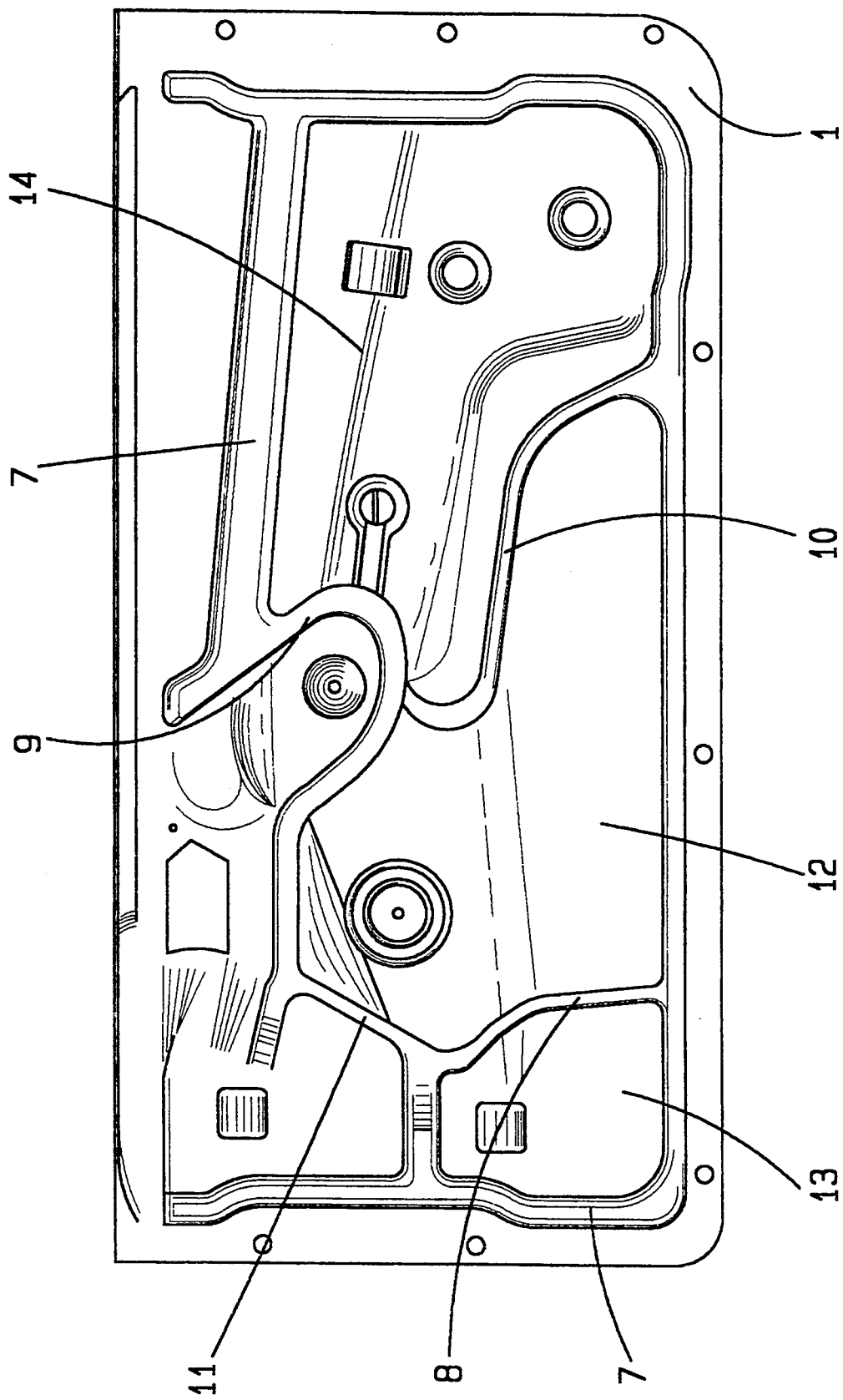
FIG. 2 is an elevation view of the other (wide) side of the insulation part.

Furthermore, the insulation part 1 is profiled, namely has, in particular, a substantially circumferential edge bead 7. This edge bead 7 is preferably substantially U-shaped in cross section. It therefore makes it possible to obtain practically simultaneous application against the inner wall lining 3 and inner wall 4 over a slight length of the insulation part 1. The insulation part is, as it were, clamped in installed condition between these walls on basis of its own structure. In addition to this edge bead 7, there can be noted, in particular in FIGS. 1 and 2, further bead developments 8, 9, 10 and 11. Between these bead developments 7, 8, 9, 10, 11 there extend free standing sections 12, 13, 14, etc., free in the sense that they are free to deflect without contacting the inner wall lining 3 and the inner wall 4. These free standing sections are, as can be noted, of different size. In this way, different frequencies of the sound can be absorbed. Due to the fact that the insulation part 1 otherwise consists of a closed-cell foam, for instance polyethylene, the desired moisture barrier is also obtained at the same time by the insulation part 1.

The density of the foam is furthermore preferably within a range of 30 kg to 120 kg per $m^3$. Together with the development of the free standing sections 12, 13, 14, there can thus be obtained a very substantial, precise adaptation to the specific noise problems.

In addition, the partial cavities 15, 16, 17, 18, 19, 20, etc. created in this way (see, in this connection, FIGS. 6 and 7 again) can also be filled with an absorber, such as, for instance, open-cell polyurethane foam- Of course, merely some of these partial cavities can also be filled with the absorber. In this way, there is created a further possibility of adjustment with respect to specific sources of noise.

Figure 3:
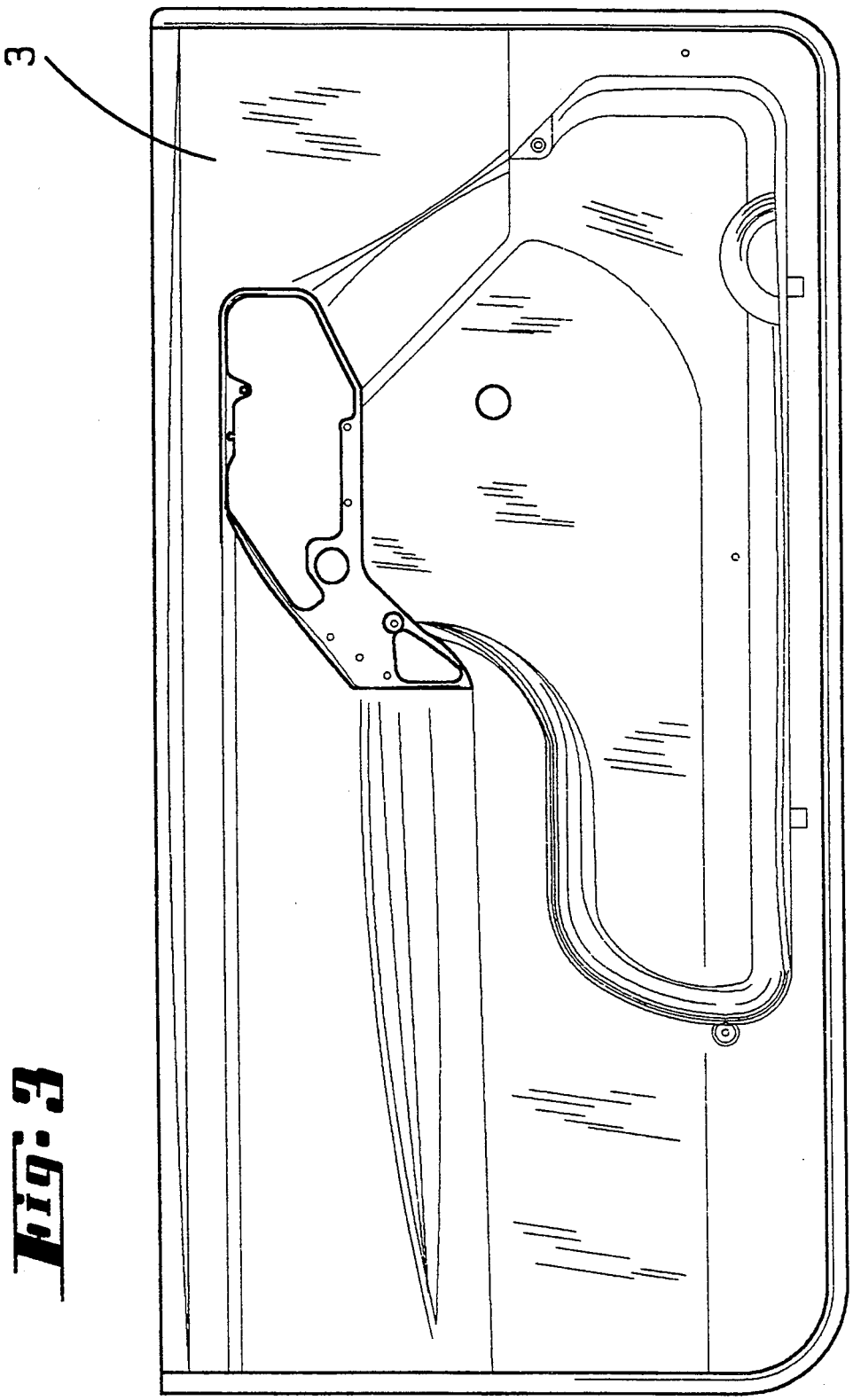
FIG. 3 is a corresponding elevation view of a wide-side of an inner wall lining of an automobile door.
Figure 4:
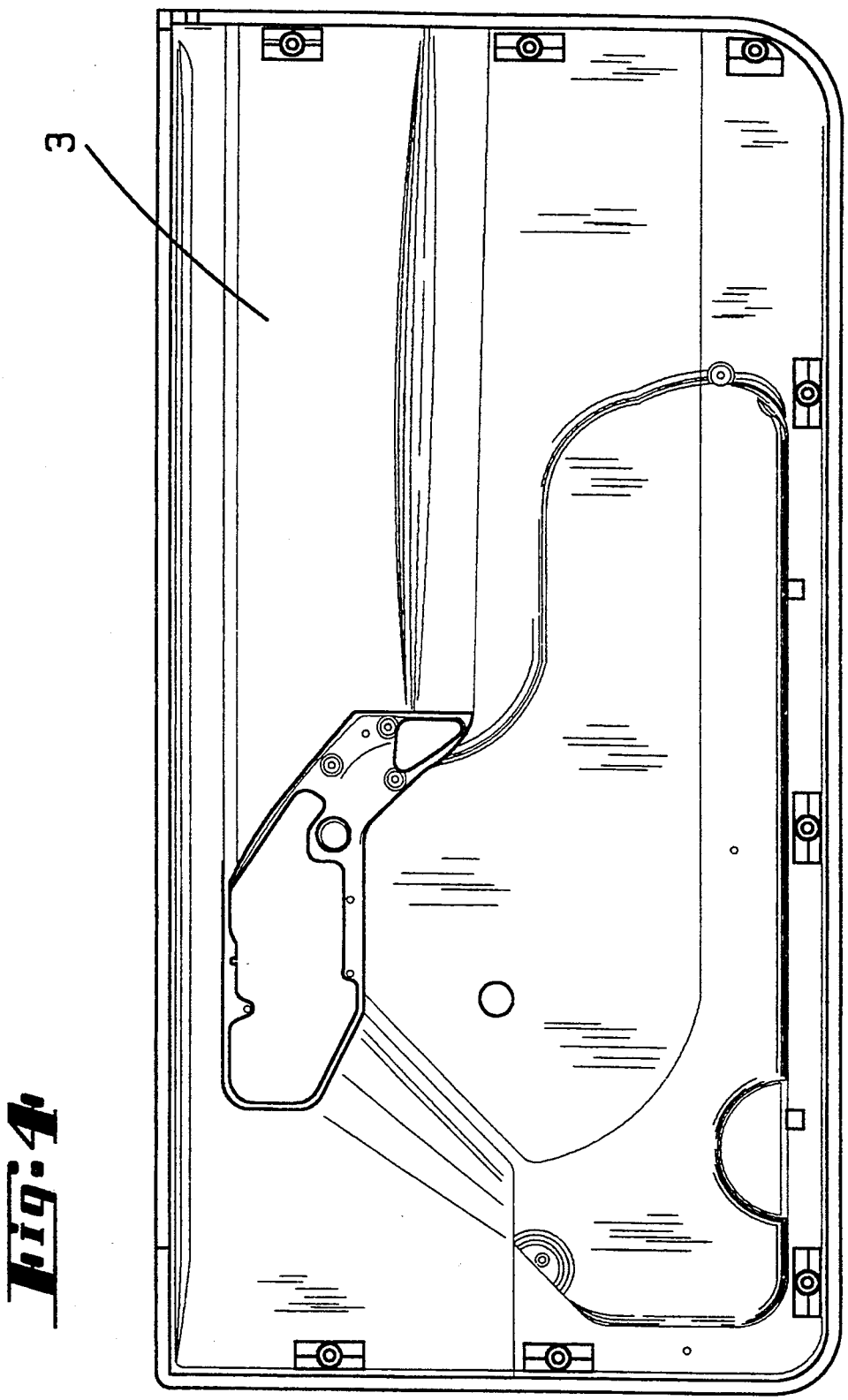
FIG. 4 is an elevation view of the other wide-side of the inner wall lining of FIG. 3.

In FIGS. 3 and 4 the corresponding outer and inner sides of the door inner lining 3 are shown. It can be noted that substantially fewer profilings are present than in the insulation part 1 of FIGS. 1 and 2. The advantageous acoustic system indicated is obtained only by the insulation part 1 and the beads present there which divide up the individual chambers, in combination with the door inner lining 3 and the inner door wall 4.

Figure 5:
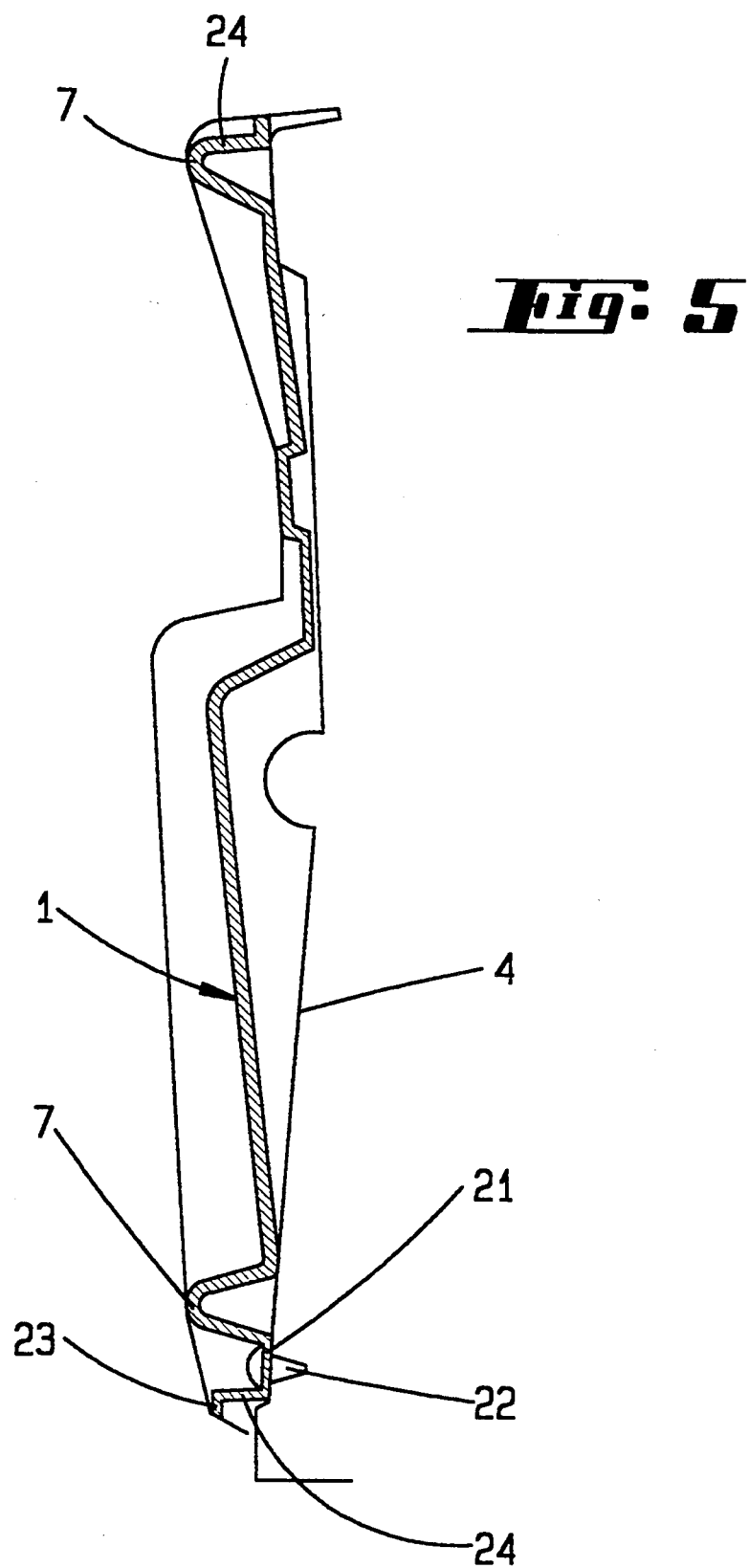
FIG. 5 is a first diagrammatic cross-sectional view of the insulation part in installed condition between the inner wall lining and an inner wall of the automobile door.

In particular, from the diagrammatic showing of FIG. 5, it can also be noted that an attachment section 21 at least partially adjoins the edge bead 7 by a development which is substantially also U-shaped but opens in the opposite direction, which attachment section can be passed through, for instance, by a clip 22 which connects the insulation part 1 to the inner door wall 4. Furthermore, this attachment section 21 is preferably an adhesive section. On its outer surface, i.e. the surface of the attachment section 21 facing the wall 4, a bead of adhesive is applied for this purpose. An opening for the fastening clip 22 which has already been prestamped into the attachment section 21 is covered in this connection by the adhesive bead, so that upon the insertion of the clip 22 this adhesive bead is passed through by the clip 22, thus obtaining an intimate adhesive connection also in addition to the clip action.

A sealing lip, developed integral with the insulation part 1, is furthermore provided on its outside, adjoining the circumferential edge bead 7 and the attachment section 21. Said lip consists of a projection bent off in lip-like manner which is of small size as compared with the edge bead 7. As can be noted in particular from the showing of FIG. 5, the lip-like projection or edge lip 23 is developed substantially at right angle as seen in cross section to the preceding web regions 24. In this connection, it is preferred that the outside dimensions of the insulation part be such that a certain oversize is present as compared with the actual installation dimensions. In this way, an inwardly directed spring action of the web 24 or lip 23 is readily obtained due to the flexible properties of the foam, so that the lip rests with a certain initial tension against the inner surface of the door inner lining 3. The edge bead 7 or the other said beads can furthermore, in the same way, also be developed with a certain oversize so that a firm attachment of the insulation part in the hollow space between the inner wall lining and the door wall is obtained in the installed condition. The insulation part 1 can be produced by thermal deformation in the manner shown. The above-indicated basic structure of the insulation part 1, namely beadlike deformations of comparatively small thickness (in the region of 1/10 to 1/20 referred to the corresponding bead thickness), also results in a dimensionally stable structure of the insulation part 1. The part can be conveniently handled for installation. The stability corresponds approximately to that of a rigid structure, the insulation part however actually consisting of a relatively soft foam.

FIGS. 8 to 10 show embodiments in which the insulation part 1 is developed in two layers, namely of a layer of closed-cell foam 1' and a layer of open-cell foam 1". Otherwise, however, the same conditions are present as already described above with reference to the single-layer insulation part. The two-layer character is developed in such a way that the behavior of a single-layer insulation part is (still) practically present. In particular, no chambering is provided between the layers 1' and 1".

We claim:

1. An insulation part suitable for acoustic insulation and sound absorption and a moisture barrier, and suitable for emplacement in a hollow space between an inner wall and an inner wall lining of an automobile door, comprising:

a foam base which is profiled and has a continuously, approximately constant cross section which is thin as compared with the space between the inner surfaces of the inner wall and the inner wall lining;

a plurality of beads of substantially U-shape in cross-section disposed on a edge side of the foam base and serving for a mutual supporting of the insulation part on the inner surface of both the inner wall and the inner wall lining; and a plurality of free standing panels extending between beads of said plurality of beads.

2. An insulation part according to claim 1 wherein upon installation between the inner wall and the inner wall lining of a door, the panel and a plurality of said beads connecting with said panel, in combination with the inner walls, provides plural closed air chambers of different sizes.

3. An insulation part according to claim 1, wherein one of said beads is present substantially continuously along an edge of the insulation part.

4. An insulation part according to claim 1 further comprising a sealing lip adjoining one of the beads on its outside.

5. An insulation part according to claim 4 wherein the sealing lip comprises a projection which is bent off in liplike manner and is small as compared with the one bead.

6. An insulation part according to claim 4 wherein an edge section of the insulation part extends, with a right-angle outward-facing bend, into the lip.

7. An insulation part according to claim 1 wherein the foam base of the insulation part permits thermoplastic shaping.

8. An insulation part according to claim 1 further comprising an attachment section having perforations for fastening clips.

9. An insulation part according to claim 8 further comprising an adhesive bead developed on the attachment section and covering a perforation opening for a clip.

10. An insulation part according to claim 1, wherein the foam base has a single-layer construction consisting of a closed-cell foam.

11. An insulation part according to claim 1, wherein the foam base has a two-layer construction consisting of a closed-cell foam and an open-cell foam.

12. An insulation part comprising:

a foam base suitable for acoustic insulation and sound absorption and a moisture barrier and suitable to be arranged in a hollow space between an inner wall and an inner wall lining of an automobile door;

wherein the foam base has a continuous, approximately constant wall thickness which is thin as compared with the space between the inner surfaces of the inner wall and the inner wall lining, a surface of the foam base being profiled;

a plurality of beads is disposed on the foam base for providing support to the insulation part on the inner surfaces of the inner wall and the inner wall lining, including support to an edge side of the insulation part;

the bead has a substantially U-shape in cross section; and the insulation part further comprises a free standing panel extending between two of said beads.

* * * * *